(12) United States Patent
Wu et al.

(10) Patent No.: US 12,724,333 B2
(45) Date of Patent: Sep. 1, 2026

(54) DISASSEMBLY AND ASSEMBLY COMPONENT AND PROTECTIVE CASE

(71) Applicant: TILTA INC., Burbank, CA (US)

(72) Inventors: Sen Wu, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 311 days.

(21) Appl. No.: 18/430,342

(22) Filed: Feb. 1, 2024

(65) Prior Publication Data

US 2025/0180972 A1 Jun. 5, 2025

(30) Foreign Application Priority Data

Nov. 30, 2023 (CN) ........................ 202323270709.7

(51) Int. Cl.
*G03B 17/56* (2021.01)
*H04B 1/3888* (2015.01)

(52) U.S. Cl.
CPC ......... *G03B 17/566* (2013.01); *H04B 1/3888* (2013.01)

(58) Field of Classification Search
CPC ...... G03B 17/56; G03B 17/561; G03B 17/02; G03B 17/566; H04B 1/3888
See application file for complete search history.

(56) References Cited

U.S. PATENT DOCUMENTS 12,025,253 B2 * 7/2024 Magagna .............. F16L 33/035
2023/0228373 A1 * 7/2023 Hughes ................ F16M 13/022
206/320

FOREIGN PATENT DOCUMENTS

CN 218450199 U 2/2023

* cited by examiner

*Primary Examiner* — Tuan H Nguyen
(74) *Attorney, Agent, or Firm* — LOZA & LOZA, LLP; Derek W. Yeung

(57) ABSTRACT

The present disclosure provides a disassembly and assembly component and a protective case. The disassembly and assembly component comprises a quick disassembly base and a plurality of clamping components. Two of the plurality of clamping components are positioned on opposite sides of the quick disassembly base, one end of each of the two clamping components protrude beyond the quick disassembly base, forming clamping portions. A clamping space is created between the clamping portions, with at least one of the clamping components being movably connected to the quick disassembly base. A mounting portion is arranged on a side of the quick disassembly base opposite to the clamping space for mounting a photographic accessory. This enables the swift disassembly and assembly of the disassembly and assembly component on the protective case and facilitates the accommodation of various photographic accessories, meeting diverse user needs for mobile phone photography.

11 Claims, 6 Drawing Sheets

DISASSEMBLY AND ASSEMBLY COMPONENT AND PROTECTIVE CASE

CROSS-REFERENCE TO RELATED APPLICATIONS

The present Application for patent claims priority to and the benefit of pending Chinese Application No. 2023232707097, filed Nov. 30, 2023, and hereby expressly incorporated by reference herein as if fully set forth below in its entirety and for all applicable purposes.

TECHNICAL FIELD

The present disclosure falls within the protective cases domain, specifically involving a disassembly and assembly component applied to protective cases.

INTRODUCTION

With the continuous improvement in mobile phone camera capabilities, current smartphones are optimized for enhanced photography. However, their shooting capabilities are often limited to general needs, hindering versatile use. In response, a prior art technology (Application No. CN202222943812.2) discloses a mobile phone case adaptable to use photographic lenses and filters. This case accommodates a mobile phone and features a camera positioning area corresponding to the phone's camera position. The phone's camera lens is exposed at the camera positioning area. The camera positioning area protrudes from the case, with at least one snap-in position arranged on the external rim of the case. An adapter ring, equipped with a through-hole in the center for exposing the phone's camera lens, is secured to the case using at least one snap buckle corresponding to the snap-in position. Threads on the internal or external rim of the adapter ring allow the threaded connection with lenses or filters.

The prior art discloses a mobile phone case that can be easily and quickly adapted to a variety of camera lenses and filters to enhance the shooting effect of the mobile phone. However, it can only be used for adapting to camera lens and filters, remaining limited in meeting diverse user needs for additional accessories.

BRIEF SUMMARY

The primary objective of the disclosure is to provide a disassembly and assembly component for easy attachment to a protective case, enabling the integration of various photographic accessories. This expansion aims to cater to users' diverse needs in mobile phone photography.

Another objective is to offer a protective case capable of accommodating various photographic accessories to meet mobile phone users' varying shooting requirements.

To fulfill these objectives, the disclosure introduces the following technical solution.

A disassembly and assembly component, wherein comprises a quick disassembly base, and multiple clamping components. Positioned on both sides of the quick disassembly base, the two clamping components have their ends protruding outside the quick disassembly base, forming clamping portions. A clamping space is created between these clamping portions, with at least one of the clamping components being movably connected to the quick disassembly base. On the side opposite to the clamping space, the quick disassembly base forms a mounting portion for attaching a photographic accessory.

This disassembly and assembly component allows the control of the movement of at least one clamping component on the quick disassembly base, regulating the opening or clamping of the clamping space. This enables the swift disassembly and assembly of the disassembly and assembly component on the protective case. Additionally, the inclusion of the installation portion on the disassembly and assembly base facilitates the accommodation of various photographic accessories, meeting diverse user needs for mobile phone photography.

Moreover, both clamping components are hinged with the quick disassembly base. By controlling the movement of two clamping components on the quick disassembly base simultaneously, the user can regulate the opening or clamping of the clamping space. This enables the swift disassembly and assembly of the disassembly and assembly component on the protective case.

A protective case is provided, comprising a protective case body and a disassembly and assembly component. The protective case body features a receiving cavity designed to accommodate a mobile phone, with the protective case body securely clamped within the clamping space between the two clamping portions. Through the cooperation of the disassembly and assembly component and the protective case body, the protective case can support different photographic accessories to meet users' diverse needs when shooting with a mobile phone.

The benefit of this disclosure lies in the control of the movement of at least one clamping component on the quick disassembly base, regulating the opening or clamping of the clamping space. This enables the swift disassembly and assembly of the disassembly and assembly component on the protective case. Additionally, the inclusion of the installation portion on the disassembly and assembly base facilitates the accommodation of various photographic accessories, meeting diverse user needs for mobile phone photography.

DETAILED DESCRIPTION

To enhance understanding of the objectives, technical solutions, and advantages of the disclosure, a detailed description is provided in conjunction with the drawings and embodiments. It is important to note that these specific embodiments are for explanatory purposes and do not impose limitations on the disclosure.

Figure 1:
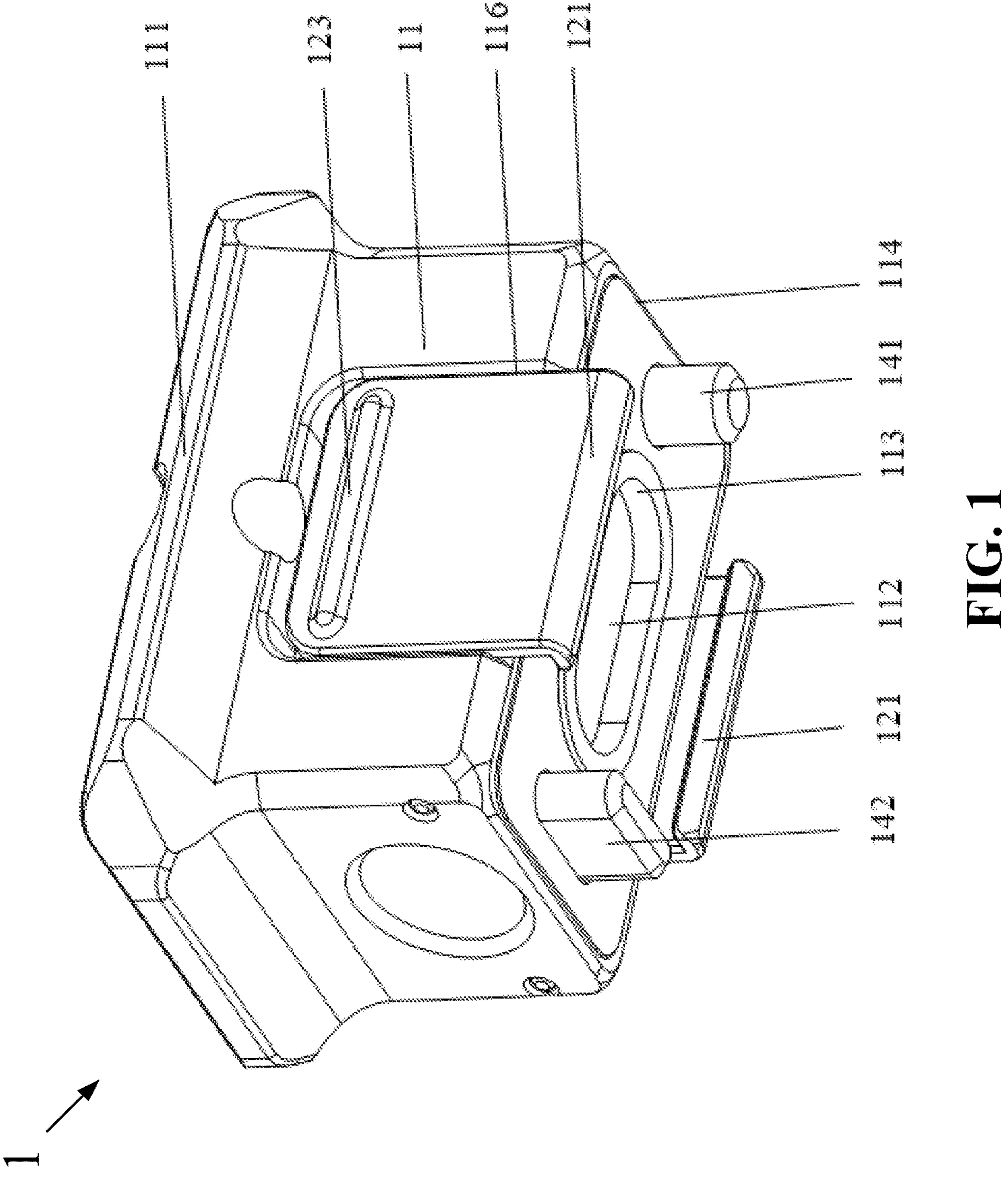
FIG. 1 is a schematic diagram of a disassembly and assembly component according to some aspects of the disclosure.
Figure 2:
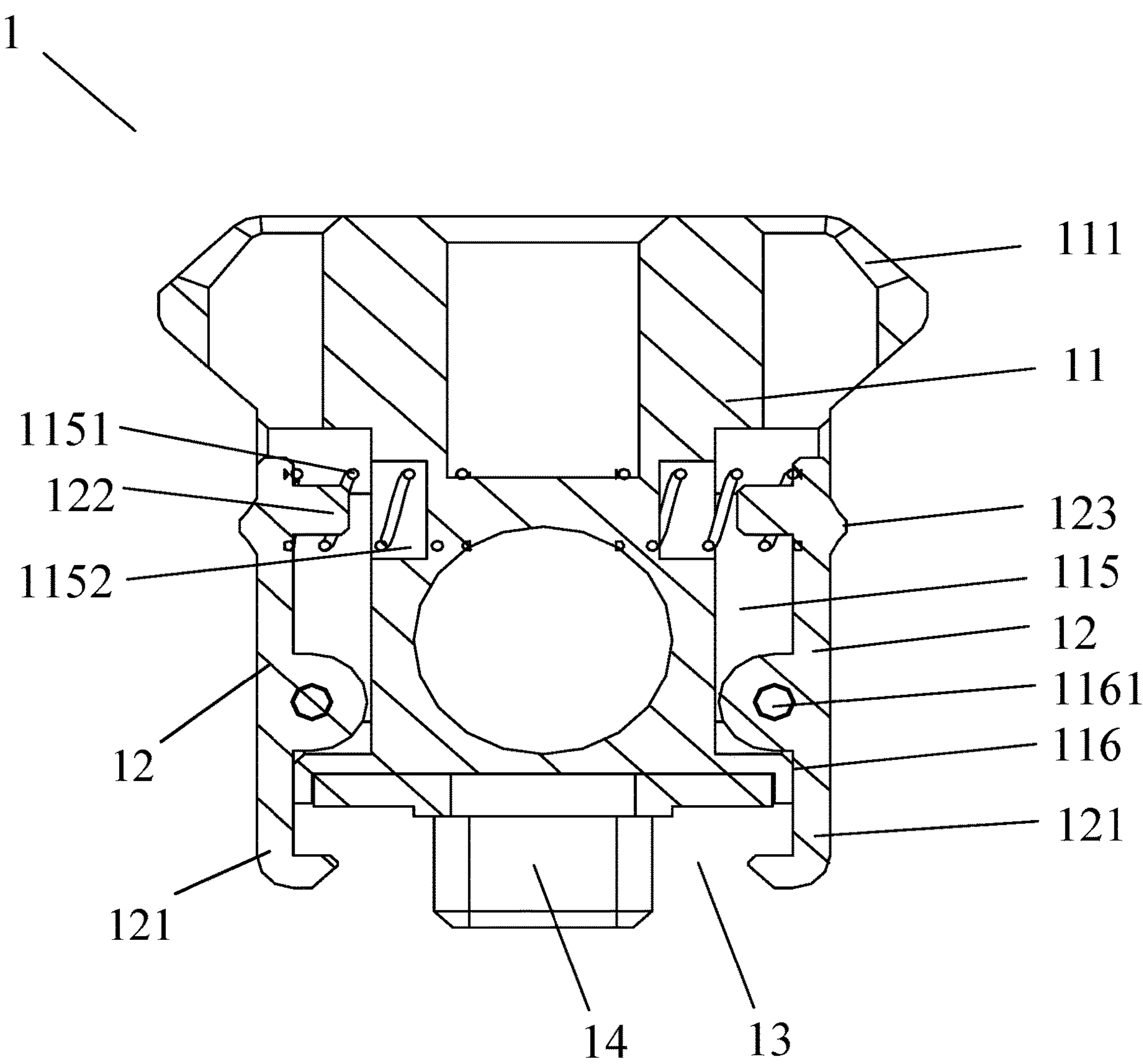
FIG. 2 is a sectional view of the disassembly and assembly component of FIG. 1.
Figure 3:
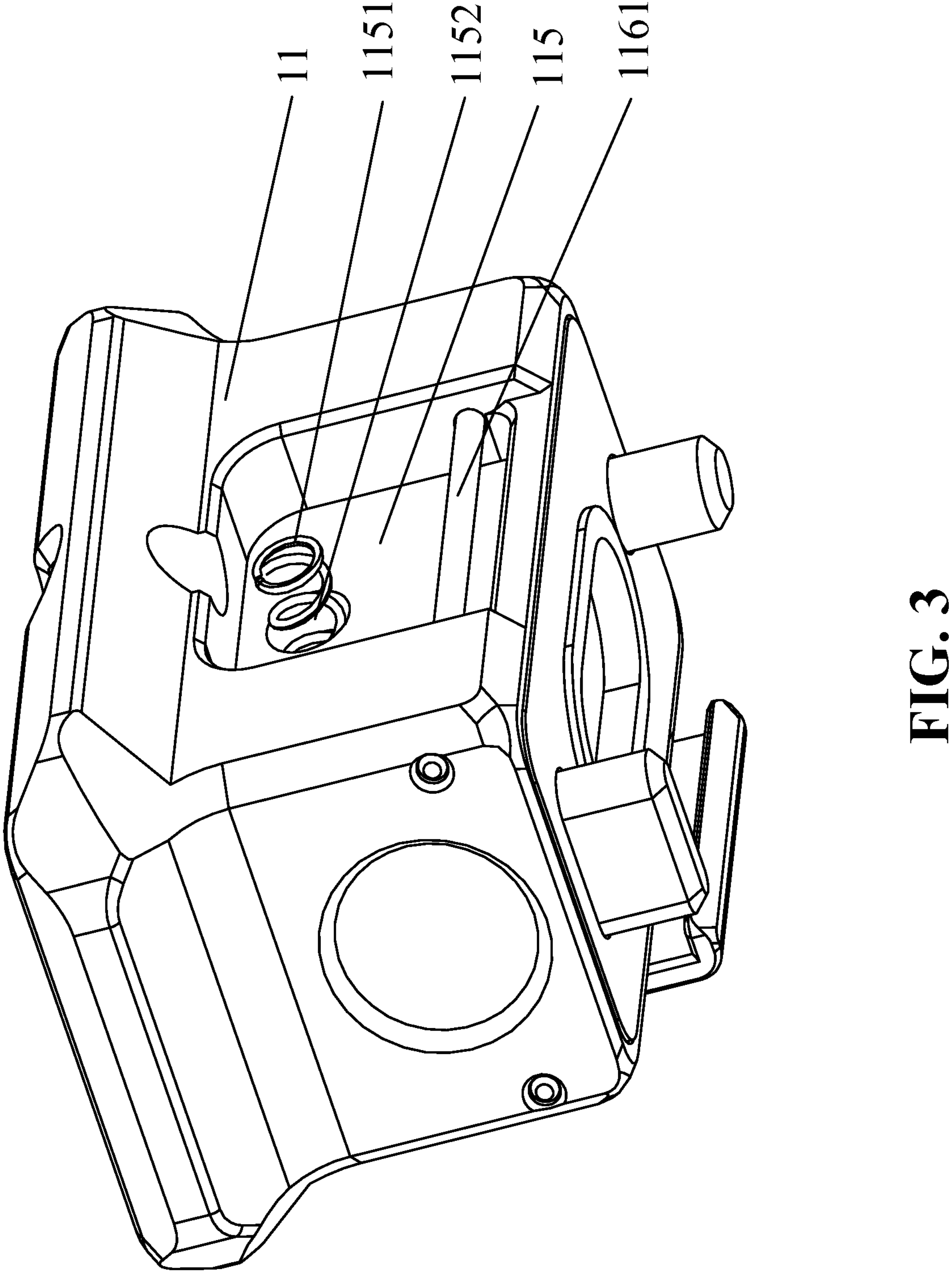
FIG. 3 is a schematic diagram of the disassembly and assembly component of FIG. 1 with one clamping component not being shown.
Figure 4:
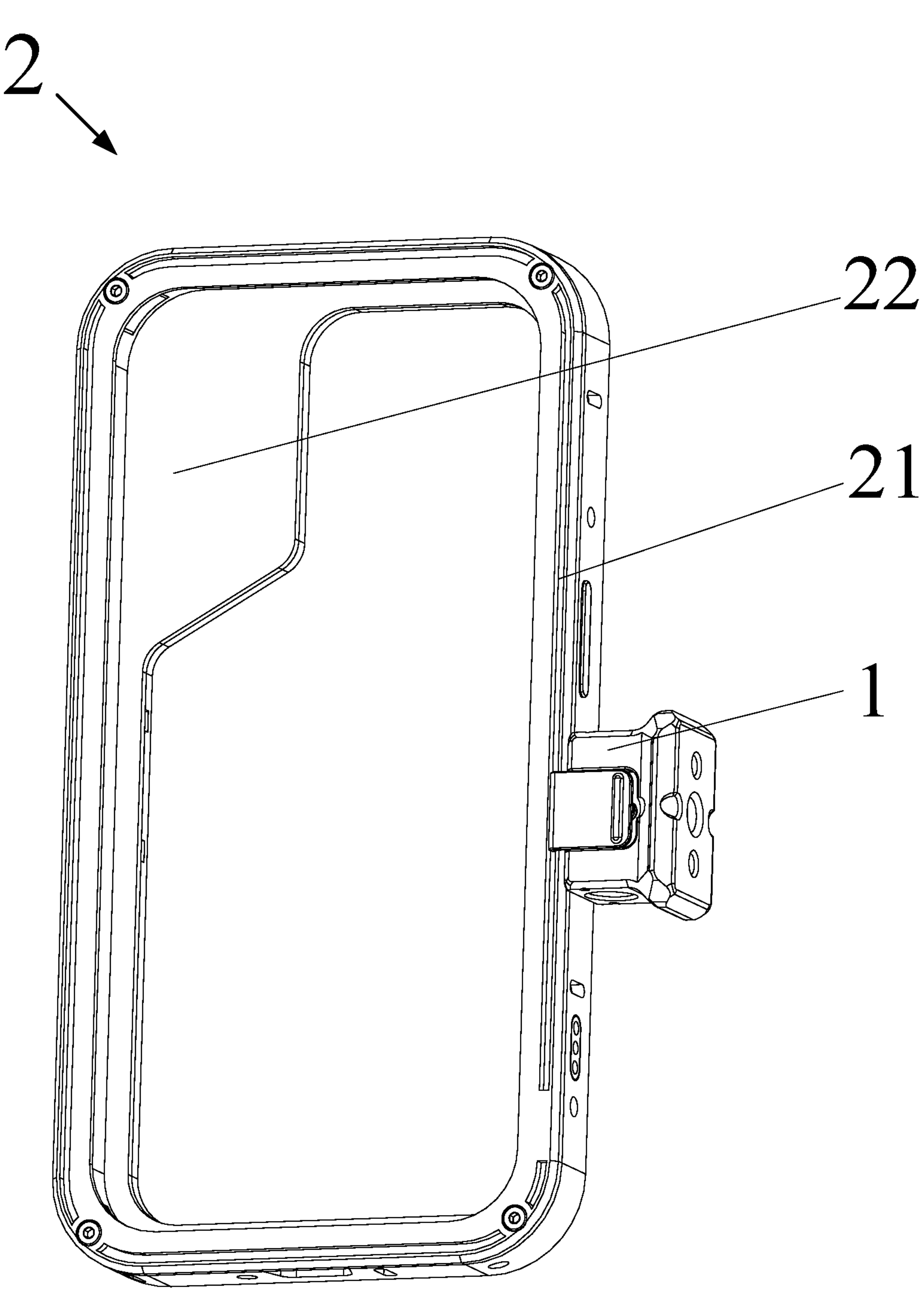
FIG. 4 is a schematic diagram of a protective case according to some aspects of the disclosure.

Referring to FIGS. 1-3, this disclosure provides a disassembly and assembly component 1, wherein the disassembly and assembly component 1 comprises a quick disassembly base 11, and two clamping components 12. The two clamping components 12 are respectively positioned on both sides of the quick disassembly base 11. The two clamping components 12 have their ends protruding outside the quick disassembly base 11, forming clamping portions 121. A clamping space 13 is created between these clamping portions 121, with both the clamping components 12 being movably connected to the quick disassembly base 11. On the side opposite to the clamping space 13, the quick disassembly base 11 forms a mounting portion 111 for attaching a photographic accessory. The disassembly and assembly component 1, through the manipulation of the two clamping components 12, allows for the opening of the clamping space 13 to release a protective case 2. FIG. 4 shows the disassembly and assembly component 1 attached to the protective case 2. Conversely, closing the clamping space 13 secures the disassembly and assembly component 1 on the protective case 2, enabling swift disassembly and assembly.

Figure 5:
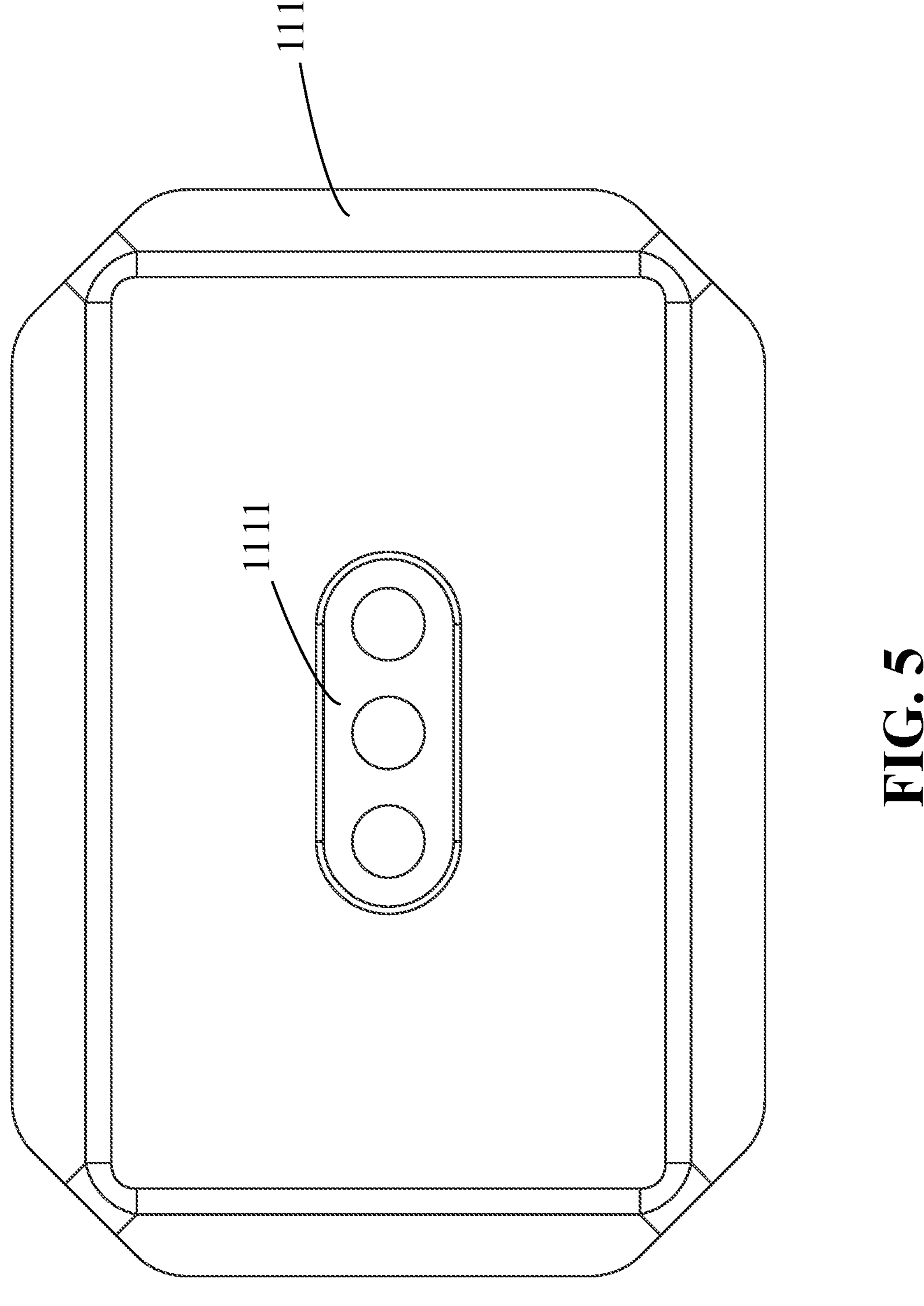
FIG. 5 is a top view of the disassembly and assembly component according to some aspects of the disclosure.

In this example, referring to FIG. 5, the quick disassembly base 11, positioned near the clamping space 13, features a first electrical interface 112. Additionally, the mounting portion 111 is equipped with a second electrical interface 1111. These interfaces are electrically connected in a manner known in the prior art. When the disassembly and assembly component 1 is mounted on the protective case 2, the first electrical interface 112 can establish an electrical connection with the corresponding interface on the protective case 2. Through the second electrical interface 1111, the disassembly and assembly component 1 can establish an electrical connection with the photographic accessory mounted on the mounting portion 111. This facilitates coordination for power supply or expansion between the photographic accessory and the phone case.

Alternatively, the first electrical interface 112 is only placed near the clamping space 13 on the quick disassembly base 11. It serves to establish an electrical connection with the corresponding interface on the protective case 2. The photographic accessory mounted on the mounting portion 111 can be directly integrated with the mounting portion 111, and the first electrical interface 112 is directly connected to the circuit board of the photographic accessory in an electrical manner.

In one embodiment, a mounting groove 113 (e.g., a slot) is present on the quick disassembly base 11 near the clamping space 13, housing the first electrical interface 112. This placement ensures protection from external structures, preventing damage to the interface.

In one embodiment, a buffer layer 114 is positioned on the quick disassembly base 11 near the clamping space 13, and the mounting groove 113 penetrates through the buffer layer 114. When the disassembly and assembly component 1 is mounted on the protective case 2, the buffer layer 114 can effectively protect the phone case from wear caused by the disassembly and assembly component 1.

In one embodiment, a positioning component 14 is placed on the quick disassembly base 11 near or around the clamping space 13. The positioning component 14 aids in quick positioning during the mounting of the disassembly and assembly component 1.

In one embodiment, the positioning component 14 can include one or more positioning columns (one positioning column 141 shown) and one or more anti-misalignment columns (one anti-misalignment column 142 shown). The anti-misalignment column 142, e.g., a rectangular column, and the positioning column 141, which may be cylindrical or have varying shapes, prevent incorrect mounting of the disassembly and assembly component 1.

In one embodiment, the clamping portions 121, e.g., bent portions formed by bending the end portions of the clamping components 12, are oppositely arranged. This design enhances stability when the disassembly and assembly component 1 is mounted on the protective case 2, providing a secure grip.

In one embodiment, the quick disassembly base 11 features a pressing groove 115, and one end of the clamping component 12 away from the clamping space 13 is positioned within (or at least partially within) the pressing groove 115. Within the pressing groove 115, a reset spring 1151 is present, with both ends of the reset spring 1151 respectively connected to the clamping component 12 and the pressing groove 115. Pressing the end of the clamping component 12 away from the clamping space 13 into the pressing groove 115, compresses the reset spring 1151, thus opening the clamping space 13 for detaching or installing the disassembly and assembly component 1 from/onto the protective case 2. Upon releasing the end of the clamping component 12 away from the clamping space 13, the reset spring 1151 restores the clamping component 12 to its original position, thus securely holding the protective case 2 inside the clamping space 13.

Figure 6:
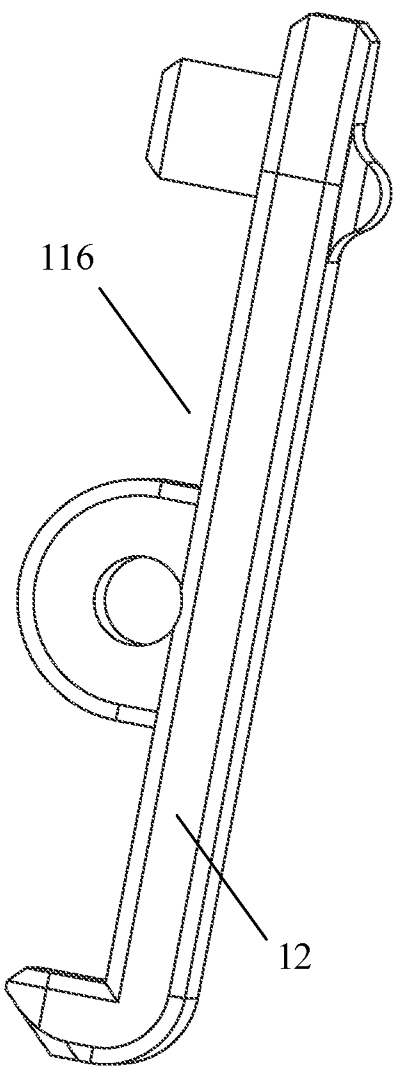
FIG. 6 is a schematic diagram of a clamping component according to some aspects of the disclosure.

In one embodiment, referring to FIG. 6, a receiving groove 116 is also present on the clamping component 12, housing or facing the pressing groove 115. The receiving groove 116 is equipped with a hinge axis 1161, on which the middle of the clamping component 12 is sleeved, allowing the clamping component 12 to avoid excessive protrusion outside the quick disassembly base 11, protecting it from impacts by external structures.

In one embodiment, a pressing protrusion 123 is positioned on the side of the clamping component 12 away from the reset spring. The pressing protrusion 123 enhances the convenience of pressing the clamping component 12.

In one embodiment, within the pressing groove 115, a spring groove 1152 is present, and the clamping component 12 is equipped with a spring column 122. One end of the reset spring 1151 extends into the spring groove 1152, while the other end of the reset spring 1151 is socketed or sleeved on the spring column 122. The coordination among the spring groove 1152, the spring column 122, and the reset spring 1151 ensures the stability of the reset spring's 1151 position.

Referring to FIGS. 1-4, this disclosure also provides a protective case 2 (see FIG. 4), wherein it comprises a case body 21 and a disassembly and assembly component 1. The protective case body 21 features a receiving cavity 22 designed to accommodate a mobile phone, with the protective case body 21 securely clamped within the clamping space 13 between the two clamping portions 121.

The above represents an exemplary embodiment of the present disclosure and is not meant to impose limitations. Any modifications, equivalent replacements, or improvements made within the spirit and principles of the disclosure are intended to be included within the scope of the disclosure's protection.

What is claimed is:

1. A disassembly and assembly component, comprising:

a quick disassembly base;

a plurality of clamping components being positioned on respective sides of the quick disassembly base, a first end of each of the plurality of clamping components protruding beyond the quick disassembly base to correspondingly form a clamping portion on a first side of the quick disassembly base, a clamping space being formed in the clamping portion, with at least one of the plurality of clamping components being hinged to the quick disassembly base at a middle part of the at least one clamping component such that the at least one clamping component pivots from its middle part; and a mounting portion being arranged on a second side, opposite to the first side, of the quick disassembly base for mounting a photographic accessory.

2. The disassembly and assembly component according to claim 1, wherein two of the plurality of clamping components are respectively hinged on opposite facing sides of the quick disassembly base.

3. The disassembly and assembly component according to claim 1, further comprising an electrical interface situated on the first side of the quick disassembly base near the clamping space.

4. The disassembly and assembly component according to claim 1, further comprising a positioning component arranged on the first side of the quick disassembly base near the clamping space.

5. The disassembly and assembly component according to claim 4, wherein the positioning component includes a positioning column and an anti-misalignment column.

6. The disassembly and assembly component according to claim 1, wherein the clamping portion comprises a bent end portion of at least one of the plurality of clamping components, and the respective bent end portions of at least two of the plurality of clamping components are oppositely arranged.

7. The disassembly and assembly component according to claim 1, wherein the quick disassembly base comprises a pressing groove, and a first end of each the plurality of clamping components, distanced from the clamping space, is positioned within the pressing groove, further comprising:

a reset spring situated inside the pressing groove, with both ends of the reset spring connected to the clamping component and the pressing groove, respectively.

8. The disassembly and assembly component according to claim 7, wherein at least one of the plurality of clamping components comprises:

a receiving groove, the pressing groove being located within the receiving groove; and a hinge axis, a middle part of the at least one clamping component being sleeved on the hinge axis.

9. The disassembly and assembly component according to claim 7, wherein a first clamping component of the clamping components comprises a pressing protrusion on a first side of the first clamping component, opposite to a second side of the clamping component facing the reset spring.

10. A protective case comprising:

a case body; and the disassembly and assembly component as described in claim 1, the case body comprising a receiving cavity designed to accommodate a mobile device, with the case body securely clamped within the clamping space between at least two of the plurality of clamping components.

11. A disassembly and assembly component, comprising:

a quick disassembly base;

a plurality of clamping components being positioned on respective sides of the quick disassembly base, a first end of each of the plurality of clamping components protruding beyond the quick disassembly base to correspondingly form a clamping portion on a first side of the quick disassembly base, a clamping space being formed in the clamping portion, with at least one of the plurality of clamping components being movably connected to the quick disassembly base;

a mounting portion being arranged on a second side, opposite to the first side, of the quick disassembly base for mounting a photographic accessory, wherein the quick disassembly base comprises a pressing groove, and a first end of at least one the plurality of clamping components, distanced from the clamping space, is positioned within the pressing groove; and a reset spring situated inside the pressing groove, with both ends of the reset spring connected to the at least one clamping component and the pressing groove, respectively.

* * * * *